March 15, 1932. M. K. DICKEY 1,849,285
SPEED CHANGING MECHANISM FOR MOTOR VEHICLES
Filed June 10, 1931 2 Sheets-Sheet 1
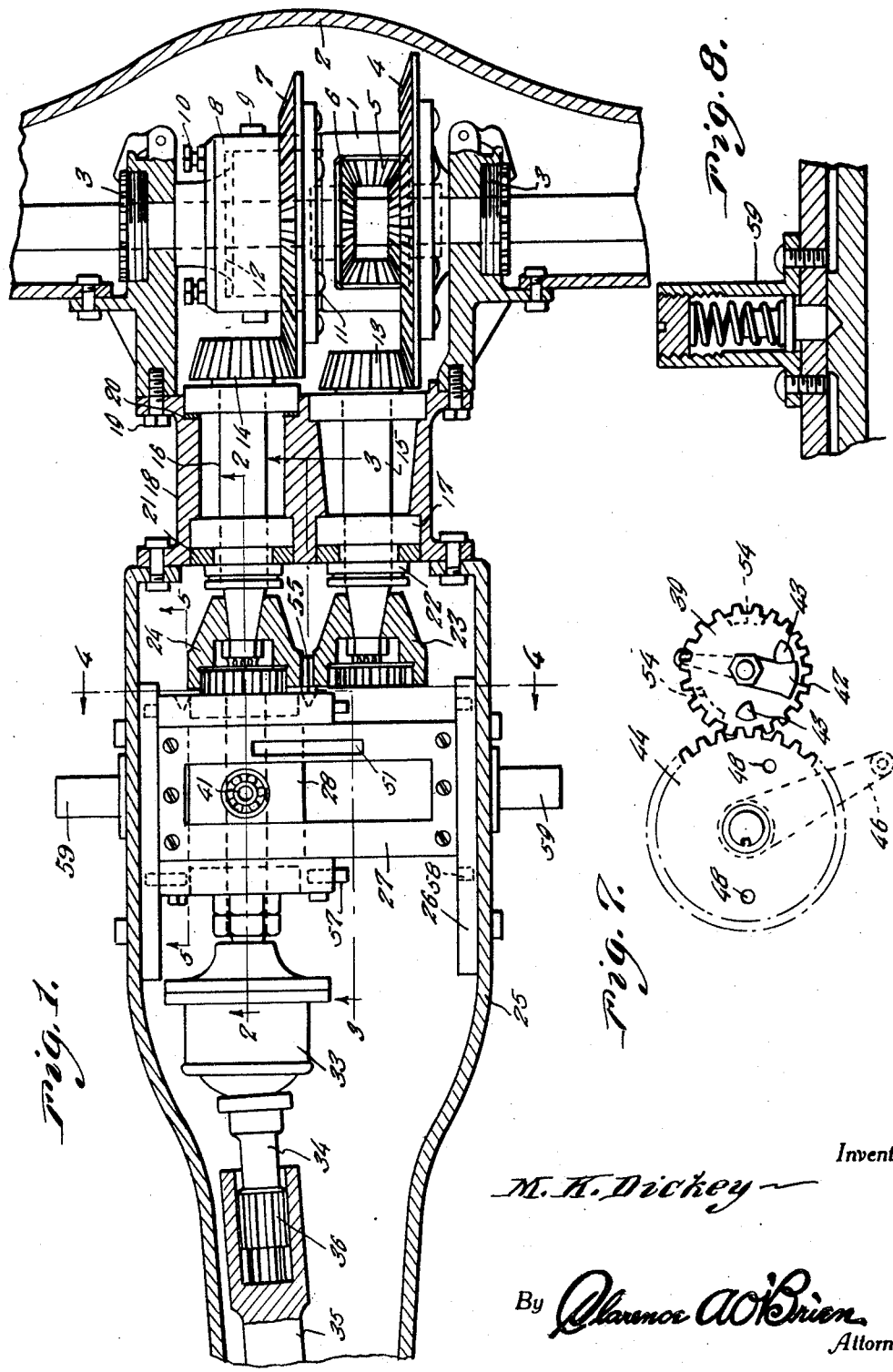
Inventor
M. K. Dickey
By Clarence A. O'Brien
Attorney March 15, 1932.  M. K. DICKEY  1,849,285
SPEED CHANGING MECHANISM FOR MOTOR VEHICLES
Filed June 10, 1931  2 Sheets-Sheet 2
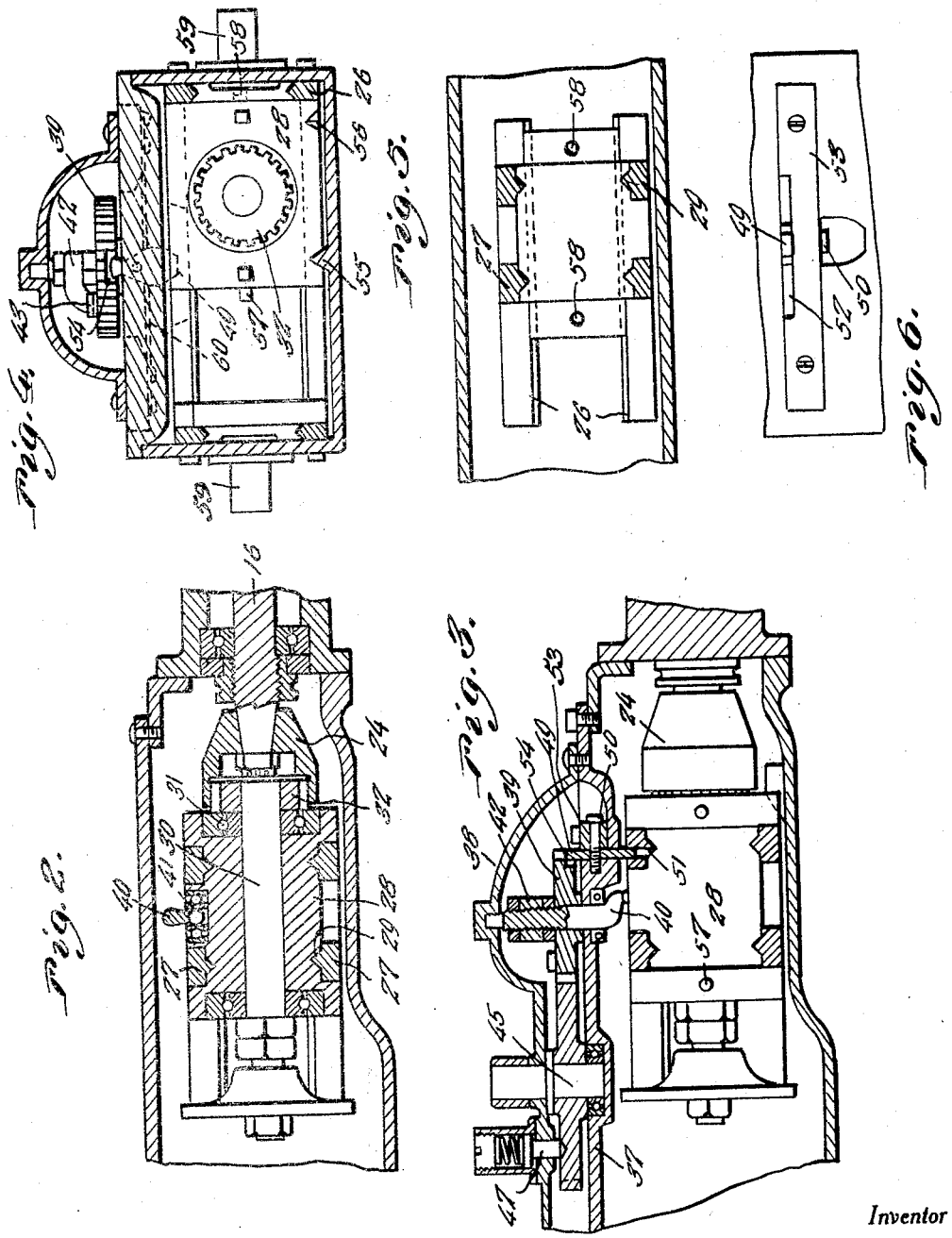
Inventor
M. K. Dickey
By Clarence A. O'Brien
Attorney Patented Mar. 15, 1932

1,849,285

UNITED STATES PATENT OFFICE

MAURICE K. DICKEY, OF DISTANT, PENNSYLVANIA

SPEED CHANGING MECHANISM FOR MOTOR VEHICLES

Application filed June 10, 1931. Serial No. 543,434.

This invention relates to a speed change mechanism for motor vehicles, the general object of the invention being to provide a second ring gear assembly in the differential of higher speed than the first or usual ring gear assembly, with manually operated means for connecting the drive shaft to either assembly, thereby providing the vehicle with six forward speeds, two direct drive speeds and four lower speeds, and also two reverse speeds.

Another object of my invention is to provide a simple arrangement of parts which will provide greater speed and operating power without additional motor power by using twin differential drive gears of different ratios, the usual differential assembly being used for power or ordinary driving, and the additional differential assembly being used for speed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a horizontal sectional view through the differential assemblies and the means for connecting them to the drive shaft.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 1.

Figure 6 is a detail plan view of the locking means for holding the shifting mechanism in operative position.

Figure 7 is a plan view of the shifting gears.

Figure 8 is a sectional view showing the spring latch at one side of the housing for the shifting mechanism.

In these drawings, the numeral 1 indicates a differential case, supported in the differential housing 2 by the adjustable bearings 3. This case carries the usual ring gear 4 and the two spider gears 5 and the axle gears 6 assembled in said case.

A high speed ring gear 7 is attached to a sleeve 8 which is machine fitted to an extension of the case 1 by set screws 9, these set screws extending through elongated slots in the sleeve to permit adjustment of the sleeve and ring gear by the use of adjusting screws 10. A space 11 is provided for adjusting shims between a shoulder on the case and the sleeve and the space 11 is provided for said adjustment.

A pinion 13 meshes with the ring gear 4 and the pinion 14 meshes with the ring gear 7, the pinions being connected respectively to the shafts 15 and 16 supported by the anti-friction means 17 in the housing 18 which is fastened to the differential housing by the bolts 19. Shims may be placed between the two housings at the point where they contact each other and shims 20 may be placed between the housing 18 and the rear bearing 17 of the shaft 16. Grease retaining rings 21 are provided for the front end of the shafts 15 and 16 and adjusting nuts 22 are also provided for the front ends of said shafts. Pocket gears 23 and 24 are connected with the respective shafts 15 and 16.

A housing 25 is connected to the forward end of the housing 18 and contains the guide ways 26 for a carriage 27 and a block 28 is slidably supported by the carriage, the carriage being provided with the guideways 29 for said block.

A shaft 30 is rotatably carried by the block and anti-friction bearings 31 are provided for the shaft and the rear end of said shaft has a pinion 32 thereon for meshing with the internal teeth of either of the pocket gears 23 and 24. The front end of the shaft is connected by a universal joint 33 with a shaft 34 which is splined to the drive shaft 35 as shown at 36.

A cover plate 37 covers an opening in the top of the housing 25 and the second cover plate 38 is bolted to this plate 37. A pinion 39 is rotatably arranged in the space between the two plates 37 and 38 and a crank 40 is rotatably carried by the pinion and has its crank engaging the anti-friction means 41 carried by the block 28. An arm 42 is connected to the upper end of the crank and is adapted to engage the two stop lugs 43 on the upper face of the pinion. A gear 44 is rotatably supported in the space between the two plates 37 and 38 as shown at 45 and this gear meshes with the pinion and is actuated from a point adjacent the driver's seat by any desired connecting means which is connected to an arm 46 connected with the gear. A spring plunger 47 carried by the plate 38 is adapted to engage either one of the holes 48 in the gear 44 to yieldingly hold it in either one of its two positions.

A lock 49 is pivoted to a part of the plate 37 as shown at 50 and is adapted to engage a slot 51 in the carriage to hold the parts in operative position, said lock extending through a slot 52 formed in a removable piece 53 which is attached to the plate 37 so that by removing this piece 53 and removing the pivot 50 the latch can be removed for repair or renewal purposes.

The pinion 39 is formed with the two notches 54 in its under face to receive the upper end of the latch. A wedge shaped projection 55 is secured to the bottom of the housing 25 and the block 28 is formed with wedge shaped recesses 56 in its lower part, one adjacent each end thereof for receiving the projections when the block is in either one of its operating positions with the gear pinion 32 in mesh with either one of the pocket gears 23 and 24. This wedge shaped projection when in engagement with a recess 56 acts to hold the block against movement. Pins 57 project from the sides of the block for engaging recesses 58 in parts of the carriage 27 to provide additional support to said block when in operative position.

Spring plungers 59 are arranged in the sides of the housing 25 to engage recesses in the ends of the carriage to yieldingly hold the carriage in operative position. I also provide a pair of springs 60 for normally holding the latch 49 in operative position.

From the foregoing it will be seen that with the parts in the position shown in Figure 1, the high speed differential or ring gear assembly is connected with the drive shaft so that the vehicle will be driven at high speed and when it is desired to drive the vehicle at regular speed it is simply necessary for the operator to actuate a lever or pedal or the like to move the arms 46 to properly rotate the gear 44 which in turn will move the gear 39.

On the first part of the movement of the pinion 39 a wall of one of the notches 54 will strike the upper end of the latch 49 so as to rock said latch on the pivot and thus move the same out of the slot 51 in the carriage. Then a stop lug 43 on the pinion engages the arm 42 and then the movement of the pinion is communicated to the crank 40 so that the block 28 and carriage 27 are moved by the crank, the carriage moving forwardly and then rearwardly and the block moving with the carriage and at the same time moving across the carriage which results in disengaging the gear 32 from the pocket gear 24 and engaging said gear 32 with the pocket gear 23. Then the vehicle will be driven at the usual speed due to the fact that the regular ring gear 4 is driving the rear wheels.

Thus I have provided simple means enabling the vehicle to be driven in either one of its ordinary speeds or at higher speeds and the mechanism also enables the vehicle to be moved in reverse at a speed higher than the usual reverse speed.

As before stated this invention provides the vehicle with six forward speeds and two reverse speeds.

While the drawings show the invention used with the torque tube or closed drive shaft housing it will of course be understood that it can be used without the use of the torque tube as the invention can be readily used with the open drive shaft.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:

1. In a motor vehicle including a drive shaft and differential, said differential including the ordinary ring gear assembly, a pinion engaging the ring gear and a shaft for the pinion, a second ring gear associated with the differential and of different ratio from the first ring gear, a pinion engaging the second ring gear, a shaft carrying the last mentioned pinion, pocket gears on the pinion shafts, a carriage, means for supporting the carriage for forward and rearward movement, a block carried by the carriage and supported therein for transverse movement, a shaft carried by the block and having a gear on its rear end for selectively engaging the internal teeth of the pocket gears, means connecting the said shaft with the drive shaft and manually operated means for shifting the block and carriage to engage the gear carried by the shaft in the block with either one of the pocket gears such means including a rotary shaft having a crank at one end rotatably engaging the block.

2. In a motor vehicle including a drive shaft and differential, said differential including the ordinary ring gear assembly, a pinion engaging the ring gear and a shaft for the pinion, a second ring gear associated with the differential and of different ratio from the first ring gear, a pinion engaging the second ring gear, a shaft carrying the last mentioned pinion, pocket gears on the pinion shafts, a carriage, means for supporting the carriage for forward and rearward movement, a block carried by the carriage and supported therein for transverse movement, a shaft carried by the block and having a gear on its rear end for selectively engaging the internal teeth of the pocket gears, means connecting the said shaft with the drive shaft and manually operated means for shifting the block and carriage to engage the gear carried by the shaft in the block with either one of the pocket gears said means including a rotary shaft having a crank at one end rotatably engaging the block, means for locking the carriage and block in operative position and means actuated at the first part of the manually operated means for releasing the lock means.

3. In a motor vehicle including a drive shaft and differential, said differential including a ring gear, a pinion engaging the same and a shaft for the same, a second ring gear of different ratio from the first gear, means for adjustably connecting the last-mentioned ring gear with the differential means, a pinion engaging the second ring gear, a shaft for the same, pocket gears connected with the pinion shafts, a pinion carrying shaft, the pinion of which is adapted to engage either one of the pocket gears, means for connecting said shaft with the drive shaft, manually operated means for shifting the said pinion carrying shaft to place its pinion in engagement with either one of the pocket gears, means for locking the shifting means in position with the pinion in engagement with either one of the pocket gears, and means for automatically releasing the locking means at the beginning of the shifting movement.

4. In a motor vehicle including a drive shaft and differential, said differential including a ring gear, a pinion engaging the same and a shaft for the same, a second ring gear of different ratio from the first gear, means for adjustably connecting the last-mentioned ring gear with the differential means, a pinion engaging the second ring gear, a shaft for the same, pocket gears connected with the pinion shafts, a pinion carrying shaft, the pinion of which is adapted to engage either one of the pocket gears, means for connecting said shaft with the drive shaft, manually operated means for shifting the said pinion carrying shaft to place its pinion in engagement with either one of the pocket gears, means for locking the shafting means in position with the pinion in engagement with either one of the pocket gears, means for automatically releasing the locking means at the beginning of the shifting movement, and yieldable means for holding the carriage in operative position.

5. In a motor vehicle including a drive shaft and differential, said differential including a ring gear, a pinion engaging the same and a shaft for the same, a second ring gear of different ratio from the first gear, means for adjustably connecting the last-mentioned ring gear with the differential means, a pinion engaging the second ring gear, a shaft for the same, pocket gears connected with the pinion shafts, a pinion carrying shaft, the pinion of which is adapted to engage either one of the pocket gears, means for connecting said shaft with the drive shaft, manually operated means for shifting the said pinion carrying shaft to place its pinion in engagement with either one of the pocket gears, means for locking the shifting means in position with the pinion in engagement with either one of the pock gears, means for automatically releasing the locking means at the beginning of the shifting movement, yieldable means for holding the carriage in operative position, and lock means for preventing movement of the carriage and block when in operative position.

In testimony whereof I affix my signature.

MAURICE K. DICKEY.